INVENTOR.
Carl E. Hittle
BY
ATTORNEY.

United States Patent Office 2,733,875
Patented Feb. 7, 1956

2,733,875

FILM REEL TENSIONING SYSTEM

Carl E. Hittle, North Hollywood, Calif., assignor to Radio Corporation of America, a corporation of Delaware Application October 15, 1951, Serial No. 251,370

5 Claims. (Cl. 242—75)

This invention relates to film drive and film control apparatus for film advancing apparatus, such as recorders and reproducers, and particularly to a system for obtaining and maintaining a substantially constant tension in the film as it leaves a supply reel and is taken up by a take-up reel.

In co-pending J. L. Pettus U. S. application, Ser. No. 193,109, filed October 31, 1950, now Patent No. 2,657,870, granted November 3, 1953, an improved system for taking up and supplying film by and from magazine reels has been disclosed and claimed. This prior system utilizes torque motors which provide a holdback tension in the film and the required take-up tension in the film during the advancement thereof between reels. The present invention is an improvement on the drive disclosed in this co-pending application by automatically controlling the voltage to the torque motors for the reels to maintain the tension substantially constant during variations in reel diameters. It is realized that, as film is wound on a take-up reel, the diameter thereof increases and the load on the motor increases. Likewise, as the film is taken from a supply reel, the film roll diameter decreases, and, with the same voltage on the holdback motor, the tension in the film will increase.

As described hereinafter, the invention automatically increases the voltage on the motor driving the take-up reel as the reel diameter and load increase, and automatically decreases the voltage on the motor, which introduces tension in the film from the supply reel. Furthermore, since friction drags are used between the torque motors and the respective reels to prevent the motors from overrunning when the energy is removed, the invention completely removes the power from the motor of the supply reel when the film roll has reached a predetermined diameter, the holdback from there on being provided solely by the friction of the drag brakes between the motors and reel. Another feature of the invention is the provision of a circuit for removing the controlling arms during the loading or threading of the recorder or reproducer.

The principal object of the invention, therefore, is to facilitate the feeding and/or advancement of film from and to supply and take-up reels of film advancing systems.

Another object of the invention is to provide an improved film reel drive and controls therefor.

A further object of the invention is to provide an automatic film tension control from a supply reel and to a take-up reel.

A still further object of the invention is to provide an improved film advancing mechanism which maintains one substantially constant tension in the film from the supply reel and a different substantially constant tension in the film to the take-up reel.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a front, elevational view of a film recorder and reproducer embodying the invention.

Fig. 2 is a side view taken along the line 2—2 of Fig. 1.

Fig. 3 is a detailed view showing one feature of the invention.

Figure 4:
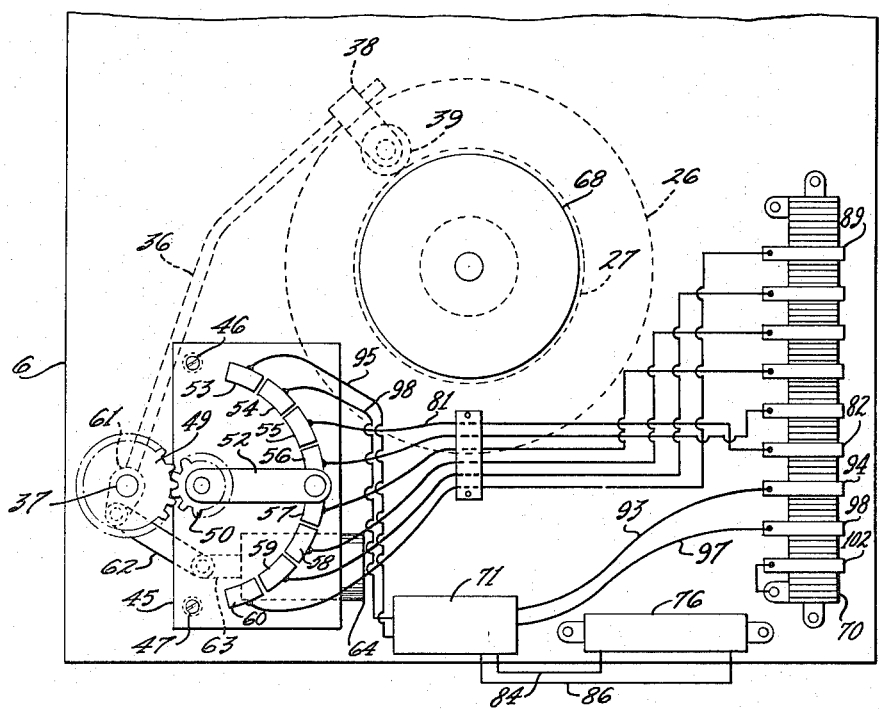
Fig. 4 is a combination schematic and diagrammatic view showing the arrangement of the automatic control elements of the invention.

Referring now to the drawings, in which the same numerals identify like elements, a magnetic film recorder and/or reproducer is mounted on three panels 5, 6, and 7. Panel 5 contains a film advancing sprocket 9 having fixed pad rollers 10 and 11 and adjustable pad rollers 12 and 13. On this panel, there is also mounted guide rollers 14, 15, 16, and 17 and speed stabilizing drums 18 and 19, which have flywheels mounted on the shafts thereof. Also positioned on panel 5 is a pair of magnetic heads 22 and 23, one of which may be a record head, and the other a monitoring or reproduce head, as disclosed and claimed in J. L. Pettus co-pending U. S. application, Ser. No. 201,658, filed December 19, 1950, now Patent No. 2,687,882, granted August 31, 1954.

On panels 6 and 7 are either supply or take-up reels, depending upon the direction of advancement of the magnetic film 25. If the film is running downwardly, the reel 26 is a supply reel for the film roll 27, and reel 28 is the take-up reel for the roll 29. The film 25 from the reel 26 passes between a fixed roller 31 and a resiliently mounted roller 32, the latter moving toward the former when the film is removed from between them to stop the reel motor. A similar arrangement of rollers is shown at 33 and 34 on panel 7. A film roll follower arm 36 is mounted on a shaft 37 and has attached to the end thereof a bracket 38 having a rotatable roller 39 adapted to bear against the film roll 27. Similarly, on panel 7 is a follower arm 40 mounted on a shaft 41 and having a bracket 42 with a roller 43 resting on the film roll 29.

Referring now to Figs. 2 and 4, the shaft 37 is pivotable in the panel 6. On the end of shaft 37 is a gear 49 which is in mesh with a smaller gear 50 rotatable on a shaft in the plate 45 attached to the panel 6 by bolts 46 and 47. (See Fig. 4.) To the gear 50 is attached a wiper arm 52 adapted to wipe over electrical conducting segments 53, 54, 55, 56, 57, 58, 59, and 60. Thus, as the arm 36 or the arm 40 moves toward and away from the axes of the respective rolls 27 and 29, the respective wiper arms 52 will move over their contacts 53—60. Since there is a differential ratio between the gears 49 and 50, the movement of the wiper arms is multiplied.

Referring to Figs. 3 and 4, a linkage lever 62 connected to an extension 61 from shaft 37 is also connected to a movable armature 63 of a solenoid 64 which may be energized from a source of current 65 when the pad roller 12 is removed from the sprocket 9 to make contact 66. This arrangement is provided so that when pad rollers 12 and 13 are removed from the sprocket to permit threading of the film or tape in the recorder or reproducer, the solenoid 64 is energized to remove the arms 36 and 40 away from the reels to permit the placement of the reels on their respective spindles.

Figure 5:
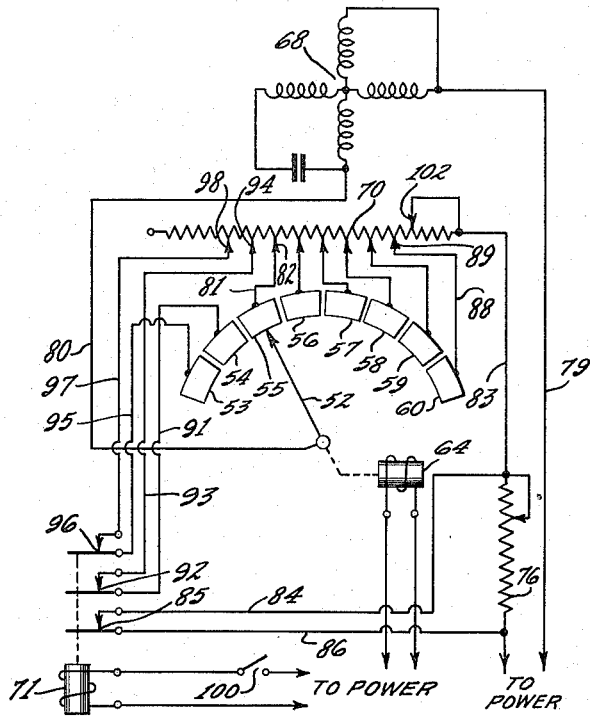
Fig. 5 is a schematic view of the automatic control circuit of the invention.

Referring now to Figs. 4 and 5, the control circuits for the respective reel motors, one of which is shown schematically at 68, are shown. A resistor 70 has mounted thereon a plurality of adjustable connector elements, the upper six of which, as shown in Fig. 4, are connected to conducting segments 55—60. The lower two elements are connected to contacts of a relay 71. Other conon each of said shafts, means connected to said last mentioned means for varying the connection of said circuits to each resistor to vary the portion of each resistor connected between said power supply and each respective motor, said circuits including a plurality of conducting segments connected to different points on each resistor, and said connection varying means including a wiper arm for each plurality of segments and movable over said segments with changes in the diameter of the film rolls on said reels, a shaft for each of said wiper arms, a gear on each of said wiper arm shafts in mesh with one of said first mentioned gears, said wiper arm gears being smaller than said first mentioned gears to obtain mechanical amplification of the movement of said first mentioned arms, a second resistor for each of said motors, a switch for reversing said motors, and means for inserting its respective second resistor in its respective motor circuit when said switch is operated to change said motor and its reel to a supply reel and removing said second resistor from its respective motor circuit when said switch is operated to change said motor and its reel to a takeup reel.

3. A system in accordance with claim 2, in which is provided a relay for each of said first mentioned resistors, each of said relays having contacts for short-circuiting said second resistor upon reversal of said motors.

4. A film tension control system for film reels comprising a commutator having separated conducting segments arranged in an arc, a resistor, connections between different points on said resistor and said segments, a wiper arm having one end adapted to move over said segments, a shaft on which the other end of said wiper arm is mounted, a gear on said shaft, a film reel, an arm having one end positioned adjacent and movable by film on said reel, a shaft for said last mentioned arm, a gear on said last mentioned shaft, said gear being in mesh with said first mentioned gear, a motor, a power supply, a connecting circuit between said power supply, said motor, and said wiper arm, a second resistor, and relay means for short circuiting said second resistor in said circuit when said motor is energized to rotate in one particular direction and to remove said short circuit when said motor is energized to rotate in the opposite direction.

5. A film tension control system in accordance with claim 4, in which said relay means has contacts, connections being provided between certain of said segments and portions of said first mentioned resistor through said contacts when closed, said contacts being closed when said motor is being energized to rotate in one particular direction and being opened when said motor is energized to rotate in the opposite direction.

References Cited in the file of this patent

UNITED STATES PATENTS

| | | |
|---|---|---|
| 947,344 | Nicholson | Jan. 25, 1910 |
| 1,304,565 | Henderson | May 27, 1919 |
| 1,343,910 | Evans | June 22, 1920 |
| 1,353,401 | James | Sept. 21, 1920 |
| 2,157,739 | McBain | May 9, 1939 |
| 2,168,777 | McCreary | Aug. 8, 1939 |
| 2,214,609 | Drake | Sep. 10, 1940 |
| 2,328,597 | Woolf | Sep. 7, 1943 |
| 2,365,691 | Fodor | Dec. 26, 1944 |

FOREIGN PATENTS

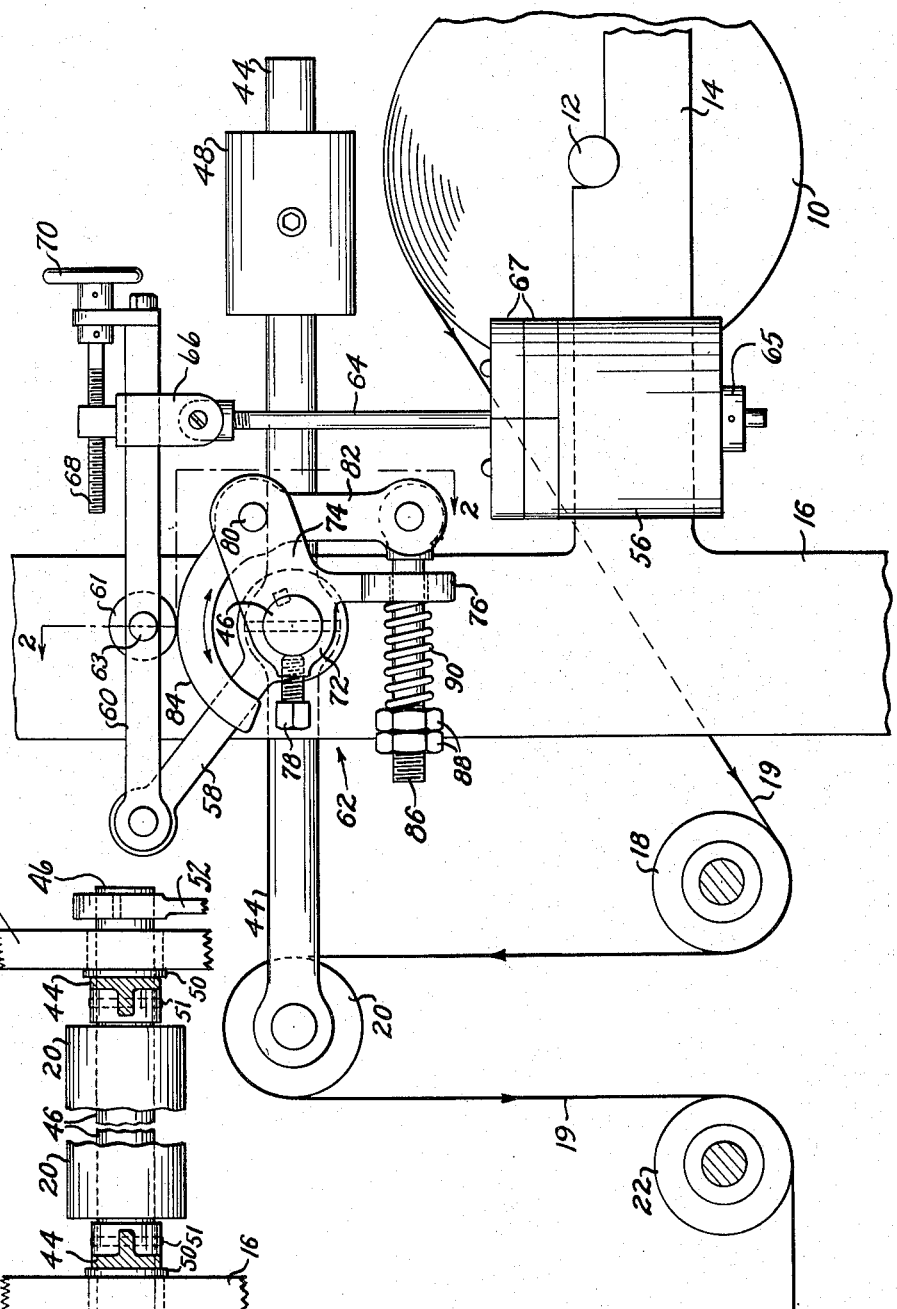

| | | |
|---|---|---|
| 283,884 | Germany | Apr. 29, 1915 |
| 502,392 | Germany | July 8, 1930 |
| 425,617 | Great Britain | Mar. 19, 1935 |
| 189,424 | Switzerland | May 18, 1937 |
| 707,953 | Germany | July 8, 1941 |